(12) United States Patent
Sawut et al.

(10) Patent No.: US 8,272,257 B2
(45) Date of Patent: Sep. 25, 2012

(54) ENGINE CONTROL EXPERIMENTING APPARATUS

(75) Inventors: Umerujan Sawut, Kanagawa-ken (JP); Shinya Yamaguchi, Kanagawa-ken (JP); Buso Takigawa, Kanagawa-ken (JP)

(73) Assignee: Nikki Co., Ltd., Atsugi (JP)

( * ) Notice: Subject to any disclaimer, the term of this patent is extended or adjusted under 35 U.S.C. 154(b) by 865 days.

(21) Appl. No.: 12/320,236

(22) Filed: Jan. 22, 2009

(65) Prior Publication Data

US 2009/0216507 A1    Aug. 27, 2009

(30) Foreign Application Priority Data

Feb. 21, 2008    (JP) .................................. 2008-040191

(51) Int. Cl.
*G01M 15/00*    (2006.01)
(52) U.S. Cl. .................................. 73/114.45; 73/114.38
(58) Field of Classification Search .......... 434/370–390; 701/101–105, 110–114; 703/13; 73/114
See application file for complete search history.

(56) References Cited

U.S. PATENT DOCUMENTS

| 4,483,278 A | * | 11/1984 | Kolacz | ........................ 123/41.33 |
| 5,147,206 A | * | 9/1992 | Golenski | ........................ 434/219 |

FOREIGN PATENT DOCUMENTS

| JP | 10-027008 | 1/1998 |
| JP | 2002-206991 | 7/2002 |

* cited by examiner

*Primary Examiner* — Timothy A Musselman
(74) *Attorney, Agent, or Firm* — Rader, Fishman & Grauer PLLC

(57) ABSTRACT

The invention aims at providing an engine control experimenting apparatus which enables to easily carry out a confirmation test of an operation in all operation states with regard to the performance of various engine control parts constituting an engine system. In this engine control experimenting apparatus, various engine control parts, which are actually mounted on an engine and are required for engine control, are constructed in a state where electrical transmission and fuel supply are enabled in a manner similar to a case where the engine control parts are mounted on a real engine, and a model-based control is performed on the same conditions as those of the actual engine, on the basis of experimental data of the real engine written in an electronic control unit constituting each of the engine control parts.

8 Claims, 1 Drawing Sheet

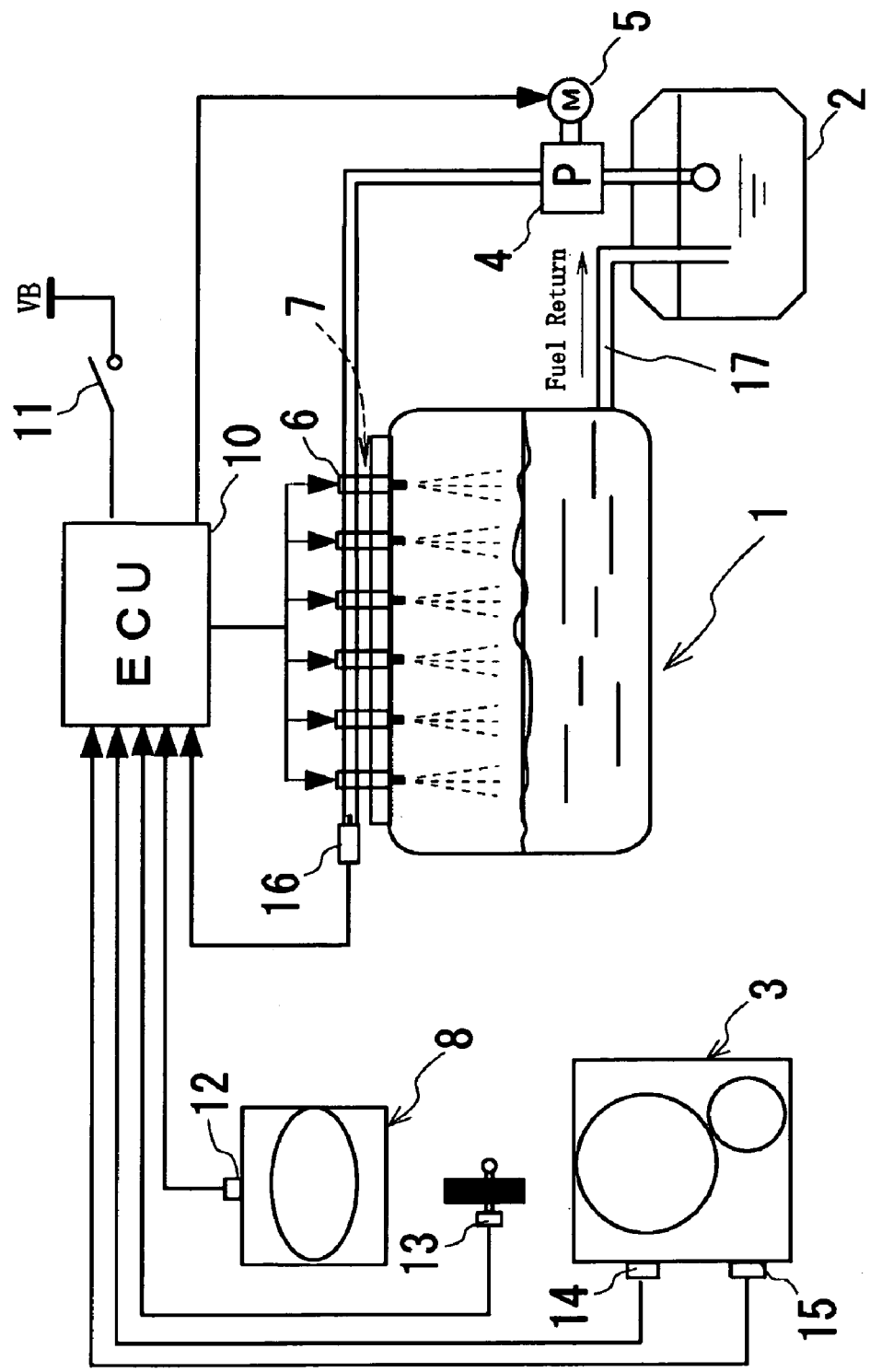

ENGINE CONTROL EXPERIMENTING APPARATUS

BACKGROUND OF THE INVENTION

1. Field of the Invention

The present invention relates to an engine control experimenting apparatus which is able to test the performance of various control parts constituting a control system of an engine in various operation states when the control parts are practically mounted on the engine.

2. Description of the Related Art

Hitherto now, when the air-fuel ratio of an electronic engine is controlled, either maps or feedback control has been used. Instead of this, a model-based control has been recently put into practice as disclosed in, for example, Japanese Patent Application Laid-Open No. 10-27008.

Meanwhile, since various engine control parts, such as actuators intended to be newly developed for being mounted on an engine, are not necessarily concurrent in the timings of development with each other, it is quite usual to individually conduct the performance test of the respective engine control parts with every engine control part.

Accordingly, when an experiment of each of the engine control parts is practically performed with a real engine system, it often takes a long time to carry out the performance test due to an interaction thereof and so on with the remaining engine control parts. As a result, there occurs such a problem that a development cycle of every engine control part must have been prolonged. Particularly, confirmation of responsiveness or the like at the time of change in the load or during the transient response of the engine must have encountered an extreme difficulty.

Against this problem, an apparatus for testing automobile parts which can test the performance of various engine control parts constituting an engine system to be mounted on a vehicle by using a simulation tool which reproduces the same operating state as that taking place when these parts are practically mounted on a true vehicle is disclosed as one of the proposals in Japanese Patent Application Laid-Open No. 2002-206991.

By performing the test by the use of this simulation tool, it has become possible to conduct the test of the performance of respective engine control parts under the conditions approximated to those mounted on the real engine system. Nevertheless, even in a case where this testing toll is employed, it is still difficult to test the performance of the respective engine control parts in all operation states of the engine. Particularly, since the simulation tool is obtained merely by reproducing, on a desk, the same conditions as those when being mounted on an actual system, it is not easy to check both hardware and software which include control performance, such as the responsiveness of an electronic control unit in various operation states of the engine.

SUMMARY OF THE INVENTION

The present invention was made to solve the problems as described above, and it is an object thereof to provide an engine control experimenting apparatus which makes it possible to control a fuel injection amount depending on an engine intake air flow rate or a rotating number of an engine, and makes it possible to easily perform a confirmation test of operation in all operation states with respect to the performance of various engine control parts to be used for constituting an engine system, thereby significantly reducing a development cycle of these engine control parts.

In order to solve the above-mentioned problems, in an engine control experimenting apparatus according to the invention, various engine control parts, which are actually incorporated in an engine and are necessary for engine control, are constructed in a model engine in a state where electrical transmission and fuel supply are able to achieve in a manner similar to a case where the engine control parts are mounted on a real engine, and a model-based control is performed on the same conditions as those of the real engine, on the basis of the experimental data of the real engine written in an electronic control unit constituting one of the engine control parts.

In accordance with the present invention, the electronic control unit in which experimental data obtained from a real engine are written performs a model-based control by using a numerical formula model in conducting a test of engine control parts, so that test results of the performance of the engine control parts even in operation states which are not actually carried out can be obtained as if control commands are issued on the basis of data obtained by the use of actual engine control parts.

As described above, by creating a numerical formula model representing the relationship of various kinds of data in advance by an experiment and storing the model in the electronic control unit which controls the engine system, performance results of the engine control parts in all operation states of an engine can be obtained, and the performance of the electronic control unit can also be confirmed from the control results.

Additionally, the engine control parts include an ignition switch, a throttle angle sensor, an accelerator pedal sensor, a crank angle sensor, a cam sensor, a fuel injection pressure sensor, an electronic control unit, an engine rotating number measuring instrument, a throttle, a fuel pump, an ignition device, an injector, a pump driving motor, a fuel tank, and a filter. Hence, model-based control of these engine control parts can be performed on the same conditions as those of the real engine.

Moreover, the model engine is formed in the shape of a transparent container whose bottom is formed liquid-tightly, and the state of ignition by an ignition device and the state of fuel injection from an injector are capable of being visually observed through a side wall of the model engine. Therefore, the state of ignition and the state of fuel injection can be visually recognized in the same state as those carried out in an actual engine. Additionally, the fuel injected from the injector and reserved at the bottom of the model engine is adapted to return to a fuel tank via a return pipe disposed at the bottom. Accordingly, fuel can be used in a circulating manner, and an experiment can be continuously conducted.

Furthermore, the electronic control unit is provided to execute at least fuel injection control, engine speed control, and air-fuel ratio control and thus, execution of confirmation of results of said respective controls using a numerical formula model according to a predetermined procedure enables to additionally perform combined checking of hardware and software of the electronic control unit.

BRIEF DESCRIPTION OF THE DRAWINGS

FIG. 1 is a layout drawing of an engine control experimenting apparatus for carrying out the present invention.

DESCRIPTION OF THE PREFERRED EMBODIMENTS

Hereinafter, the best mode for carrying out the present invention will be described with reference to the accompany drawing.

FIG. 1 is a block diagram illustrating a layout of an experimenting apparatus of various engine control parts according to the present invention. In a model engine 1, various engine control parts are constructed in a state where electrical transmission of signals and so on and fuel supply can be achieved in a manner substantially similar to a case where they are mounted on an actual engine. Specifically, an ignition device 7 which has a plurality of ignition plugs and a plurality of injectors 6 are mounted on the model engine, and fuel piping which extends from a fuel tank 2 and has a fuel pump 4 disposed on the midway is connected to the respective injectors 6. Additionally, an electronic control unit (ECU) 10 that is a fuel injection controller is adapted to further control driving of the injectors 6 and a motor 5 of the fuel pump 4 and to control driving of an electronic throttle device 8.

Particularly, in the present embodiment, the model engine 1 is formed in the shape of a container in which at least side wall portions are transparently formed of glass or hard synthetic resin, and is formed to be liquid-tight and gastight in a manner similar to a real engine. Therefore, the ignition state of the plugs in the ignition device 7 or the situation of injection from the injectors 6 can be visually observed and recognized through a side wall of the model engine 1. Additionally, the fuel injected from the injectors 6 and reserved at the bottom of the model engine 1 can return to the fuel tank 2 via a return pipe 17 disposed at the bottom. Hence, fuel can be used in a circulating manner, and an experiment can be continuously conducted.

Additionally, an ignition switch 11, a throttle angle sensor 12 attached to the electronic throttle device 8, an accelerator pedal sensor 13, a crank angle sensor 14 for measuring the number of rotation of the engine disposed in an engine ignition system 3, a cam sensor 15, and a fuel injection pressure sensor 16 are connected to the electronic control unit 10 in this embodiment, and respective output signals thereof are inputted to the electronic control unit 10.

The electronic control unit 10 serves as both an engine rotation number controller and an air-fuel ratio controller, while being a fuel injection controller. In addition to these functions, the electronic control unit 10 constitutes a core of a testing apparatus of engine parts which will be described in detail below. A model control program for testing the engine control parts, which makes it possible to test the performance of the engine control parts by using a numerical formula model derived in advance from experimental data of the actual engine without necessitating actual operation in various operation states, are stored in a storage section of the electronic control unit.

In performing an experiment by using this embodiment, when the ignition switch 11 is turned on, first, sensor signals from the throttle angle sensor 12, the accelerator pedal sensor 13, the crank angle sensor 14, the cam sensor 15, and the fuel injection pressure sensor 16 at the moment of engine starting are inputted to the electronic control unit 10.

Then, in the electronic control unit 10, calculation of the various input sensor signals is performed by using the numerical formula model that is the invention formed on the basis of the experimental data by actual equipment written in advance in the electronic control unit 10. At this time, information required for engine control, such as an engine rotating number, an engine water temperature, a vehicle speed, a throttle angle, and an air flow rate required for an engine, are calculated as target signals, and fuel injection timing is determined by the information calculated from the numerical formula model. In the electronic control unit 10, control is made such that output signals of engine control parts, such as an engine rotation number measuring instrument composed of the crank angle sensor 14 and the cam sensor 15, the electronic throttle device 8, the fuel pump 4, the ignition device 7, and the injectors 6, converge into given target values.

As described above, according to this embodiment, even if the engine is operated under any operating conditions, it can be confirmed that an actual engine rotating number, a throttle angle, a fuel injection pressure, etc. always converge into designated target values, and it is demonstrated that the present invention is very effective.

Hereinafter, the model-based control by the program in the electronic control unit 10 that is an embodiment of the present invention will be described in detail.

(1) Numerical Formula Model of Intake System:

(a) Numerical Formula Model of Throttle System

A numerical formula model about an electronically controlled throttle system is as follows. First, when the electric properties of a DC motor that is a throttle driving part of the electronic throttle device 8 is discussed, the relationship between current and voltage in an armature of an armature circuit is expressed by the following formula (1) according to the Kirchhoff's law.

$$L\frac{di_a}{dt} + R_a i_a + K_e N \frac{d\theta}{dt} = U_a \tag{1}$$

(where $i_a$ is an armature current, $U_a$ is the input voltage of both ends of the armature, L is inductance of the armature, $R_a$ is the resistance of the armature, $K_e$ is an induced voltage constant, N is a gear ratio, and $\theta$ is a throttle angle)

Next, the mechanical properties of the throttle will be discussed. If the generated torque of the motor (T) is defined as $T = NK_t i_a$, the equation of motion of the electronically controlled throttle system is eventually obtained like Formula (2) according to the Newton's law.

$$J\frac{d^2\theta}{dt^2} + D\frac{d\theta}{dt} + d_k \text{sign}\left(\frac{d\theta}{dt}\right) + K_s \theta = NK_t i_a \tag{2}$$

(where J is the total moment of inertia in terms of a throttle axis of the system, D is a viscous frictional coefficient, $d_k$ is Coulomb friction, $K_s$ is the spring constant of a return spring, and $K_t$ is a torque constant)

Also, when it is assumed that a motor current can be controlled without delay (that is, the inductance component L of the armature is negligible), and Formula (1), above is substituted into Formula (2), above Formula (3) is obtained.

$$\ddot{\theta} = -\frac{1}{J}\left(D + \frac{N^2 K_t K_e}{R_a}\right)\dot{\theta} - d_k \text{sign}(\dot{\theta}) - \frac{1}{J}K_s\theta + \frac{NK_t}{R_a J}U_a \tag{3}$$

If state variables are defined as $x_1 = \theta$ and $x_2 = \dot{\theta}$ in Formula (3), the state equation and output equation of the system are obtained as follows.

$$\begin{bmatrix} \dot{x}_1 \\ \dot{x}_2 \end{bmatrix} = \begin{bmatrix} x_2 \\ a_1 x_1 + a_2 \text{sign}(x_2) + a_3 x_2 \end{bmatrix} + \begin{bmatrix} b_1 \\ b_2 \end{bmatrix} U_a \tag{4}$$

$$y = x_1 \tag{5}$$

In the above state equation, $$a_1 = -\frac{K_s}{J}$$

$$a_2 = -\frac{d_k}{J}$$

$$a_3 = -\left(\frac{D}{J} + \frac{N^2 K_t K_e}{R_a J}\right)$$

$$b_1 = 0$$

$$b_2 = \frac{NK_t}{R_a J} \text{ and,}$$

y is an observation value.

(where $U_a$ is the input voltage of both ends of an armature, $R_a$ is the resistance of the armature, $K_e$ is an induced voltage constant, N is a gear ratio, J is the total moment of inertia in terms of a throttle axis of a system, D is a viscous frictional coefficient, $d_k$ is Coulomb friction, $K_s$ is the spring constant of a return spring, $K_t$ is a torque constant, $a_1$ to $a_3$ and $b_1$ and $b_2$ are constants, and $x_1$ and $x_2$ are state variables).

(b) Numerical Formula Model of Intake Manifold

The mass flow rate of air which passes through the throttle and is guided to the intake manifold is obtained as follows by a function composed only of a throttle opening, and two functions composed of atmospheric pressure and manifold pressure.

$$\dot{m}_a = f(x_1) g(P) \tag{6}$$

$$f(x_1) = c_1 + c_2 x_1 + c_3 x_1^2 - c_4 x_1^3 \tag{7}$$

$$g(P) = \begin{cases} 1 & \text{if } P \le \frac{P_a}{2} \\ \frac{2}{P_a}\sqrt{PP_a - P^2} & \text{if } \frac{P_a}{2} \le P \le P_a \\ -\frac{2}{P}\sqrt{PP_a - P_a^2} & \text{if } P_a \le P \le 2P_a \\ -1 & \text{if } P \ge 2P_a \end{cases} \tag{8}$$

(where $\dot{m}_a$ is the mass flow rate of the air guided to the intake manifold, $P_a$ is the atmospheric pressure, P is the manifold pressure, and $c_1$ to $c_4$ are constants)

On the other hand, the air mass flow rate from the manifold to a cylinder is calculated like the following formula (9) by the engine revolution number and the manifold pressure.

$$\dot{m}_c = -i_1 N - i_2 P + i_3 NP + i_4 NP^2 \tag{9}$$

(where $\dot{m}_c$ is the air mass flow rate to a cylinder, N is the engine revolution number, and $i_1$ to $i_4$ are constants)

Accordingly, the model of the intake system is obtained as follows by a differential equation for the manifold pressure by using Formula (6) and Formula (9).

$$\dot{P} = \frac{RT_m}{V}(\dot{m}_a - \dot{m}_c) \tag{10}$$

(where $\dot{m}_a$ is the mass flow rate of the air guided to an intake manifold, $\dot{m}_c$ is an air mass flow rate to a cylinder, R is a gas constant, $T_m$ is the temperature within the intake manifold, and V is the volume of the intake manifold).

(2) Numerical Formula Model of Engine Rotation system:

The equation of motion of the engine rotation system is expressed by the following formulas.

$$\dot{N} = \frac{30}{J_e \pi}(T_i - T_L) \tag{11}$$

$$T_i = -k_1 + k_2 \frac{\dot{m}_c}{N} + k_3 \delta + k_4 N \delta - k_5 \delta^2 + k_6 N - k_7 N^2 \tag{12}$$

and, $$T_L = \beta N^2 + T_d \tag{13}$$

(where N is an engine revolution number, $\dot{m}_c$ is an air mass flow rate to a cylinder, $J_e$ is the moment of inertia of a moving part, $T_i$ is an engine torque, $T_L$ is a load torque, $T_d$ is an accessory torque, $k_1$ to $k_7$ are constants, $\delta$ is an ignition timing, and $\beta$ is a constant)

(3) Numerical Formula Model of Fuel System:

(a) Numerical Formula Model of Pump Driving Motor

A numerical formula model of the direct-current motor 5 that is a driving part of the fuel pump 4 is given like Formula (14) which is well known conventionally.

$$\ddot{\theta}_p = -\frac{1}{J_a}\left\{\left(D + \frac{N^2 K_t K_e}{R_a}\right)\dot{\theta}_p - d_k \text{sign}(\dot{\theta}_p) - T_L\right\} + \frac{N^2 K_t}{R_a J_a} U_t \tag{14}$$

(where $U_t$ is the input voltage of both ends of the armature, $R_a$ is the resistance of the armature, $K_e$ is an induced voltage constant, N is a gear ratio, $\theta_p$ is a cam rotation angle (pump rotating speed), $J_a$ is the total moment of inertia in terms of a cam axis of the system, D is a viscous frictional coefficient, $d_k$ is Coulomb's constant, $K_t$ is the torque constant of the motor, and $T_L$ is a total load torque)

(b) Numerical Formula Model of Pump Discharge Pressure and Fuel Injection Amount Pump discharge pressure and fuel injection amount are experimentally calculated by the following formulas.

$$\frac{dP_f}{dt} = \left(\rho Q_i - \rho Q_j V_p \frac{dp}{dt}\right)\frac{1}{V_p K_v} \tag{15}$$

$$Q_j = C_n A_n \sqrt{2g\frac{(P_f - P_a)}{\rho}} \tag{16}$$

(where $P_f$ is an injection pressure, $\rho$ is a fuel density within the piping, $Q_j$ is the fuel injection amount, $V_p$ is a piping volume from a pump outlet to an injector, $K_v$ is a volumetric elastic modulus, $C_n$ is an injection flow rate coefficient, $A_n$ is the area of an injection port, and $P_a$ is the atmospheric pressure)

(c) Numerical Formula Model of Whole Fuel System

The total discharge flow rate of the fuel pump 4 is a function of a pump shaft rotating speed. If state variables are defined as $z_1 = \theta_p$, $z_2 = \dot{\theta}_p$ and $z_3 = P_f$, the state equation and output equation of the system are as follows by Formula (14) and Formula (15).

$$\begin{bmatrix} \dot{z}_1 \\ \dot{z}_2 \\ \dot{z}_3 \end{bmatrix} = \begin{bmatrix} z_2 \\ w_1 z_2 + w_2 \text{sign}(z_2) + w_3 T_L \\ (\rho Q_i - \rho Q_j - V_p \dot{p} dt) \dfrac{1}{V_p K_v} \end{bmatrix} + \begin{bmatrix} g_1 \\ g_2 \\ g_3 \end{bmatrix} U_i \quad (17)$$

$$y = x_3 \quad (18)$$

In the above state equation, $$w_1 = -\left(\frac{D}{J} + \frac{N^2 K_t K_3}{RJ}\right)$$

$$w_2 = -\frac{d_k}{J}$$

$$w_3 = -\frac{1}{J}$$

$$g_1 = 0$$

$$g_2 = \frac{NK_t}{RJ}$$

$$g_3 = 0 \text{ and,}$$

$y = P_f$ is an observation value.
(where $U_i$ is the input voltage of both ends of an armature, $T_L$ is a total load torque, $\rho$ is a fuel density within the piping, $Q_j$ is a fuel injection amount, $V_p$ is a piping volume from a pump outlet to an injector, $K_v$ is a volumetric elastic modulus, $K_e$ is an induced voltage constant, $K_t$ is the torque constant of a motor, N is a gear ratio, J is the total moment of inertia in terms of a throttle axis of a system, D is a viscous frictional coefficient, $d_k$ is Coulomb friction, R is a gas constant, $P_f$ is an injection pressure, $w_1$ to $w_3$ and $g_1$ to $g_3$ are constants, and $z_1$ to $z_3$ are state variables).

The electronic control unit 10 which executes control logics including the above numerical formula models is adapted to be able to accurately execute engine revolution number control, intake air flow rate control, and air-fuel ratio control in addition to the fuel injection control of the engine by using these numerical formula models. From this, the method for testing engine parts of this embodiment makes it possible not only to easily confirm the performance of each part constituting the engine system, but also to simultaneously check the hardware, software and all engine control logics of the electronic control unit 10.

Next, the operation and effects of the controller for engine parts of this embodiment will be described concretely. The object of the method for testing engine parts of the invention is to control the fuel injection amount according to the intake air flow rate or engine revolution number of the engine 1 and to simultaneously confirm the operation of the engine control parts attached to the engine 1, sensors, actuators, the electronic control unit 10, and its control logics, under all the operating conditions.

When the engine is started, at i.e., when the ignition switch 11 is turned on, output signals from the throttle angle sensor 12, the accelerator pedal sensor 13, the crank angle sensor 14, the cam sensor 15, and the fuel injection pressure sensor 16 are input to the electronic control unit 10. The input sensor signals are applied to the above-mentioned numerical formula models of the engine, and are respectively calculated by a CPU.

That is, the engine revolution number, the engine water temperature, the vehicle speed, the throttle angle, and the air flow rate required for the engine, etc. are calculated using these numerical formula models. Then, the engine revolution number, throttle angle, and the like which are calculated are delivered to a normal control sequence as target signals, the injection timing is determined by the information calculated from the models, and control is made such that respective performances of the engine rotation system 3, the electronic throttle device 8, the fuel pump 4, the ignition device 7, the injectors 6, etc. converge on target values.

As a result of having performed a test by using the method for testing engine parts of this embodiment, even if the engine 1 is under any operating conditions, it can be confirmed that the engine revolution number, the throttle angle, the fuel injection pressure, and other detection values always converge into designated target values and that various engine control parts or the hardware and software of the electronic control unit 10 function correctly.

As described above, according to the invention, it becomes possible to easily carry out a performance test in all operation states about engine control parts constituting an engine system, and it also becomes possible to simultaneously confirm the hardware and software of the electronic control unit, and all the engine control logics.

The invention claimed is:

1. An engine control experimenting apparatus, comprising:
   a model engine including a tank containing a liquid fuel, a container for receiving the liquid fuel, and an injector assembly in fluid communication with the tank and the container;
   a variety of engine control parts; and
   an electronic control unit in electrical communication with the variety of engine control parts and the injector assembly and having data storage for storing actual engine data generated by an actual engine performing under varying conditions,
   wherein the electronic control unit is operative to cause the variety of engine control parts to perform under varying simulated conditions based upon the stored actual engine data.

2. The engine control experimenting apparatus according to claim 1,
   wherein the engine control parts comprise an ignition switch, a throttle angle sensor, an accelerator pedal sensor, a crank angle sensor, a cam sensor, a fuel injection pressure sensor, an engine rotation number measuring instrument, a throttle, a liquid fuel pump, an ignition device, an injector, a pump driving motor, and a filter.

3. The engine control experimenting apparatus according to claim 2,
   wherein the container of the model engine is formed in a transparent container shape having a bottom thereof formed to be liquid-tight and the model engine includes a state of ignition by an ignition device and a state of fuel injection from an injector which are able to be visually observed and recognized through a side wall of the transparent container, and the liquid fuel injected from the injector and reserved at the bottom returns to the tank for circulation via a return pipe arranged at the bottom.

4. The engine control experimenting apparatus according to claim 3, wherein the electronic control unit is configured to execute at least fuel injection control, engine speed control, and air-fuel ratio control, and execution of confirmation of results of said respective controls using a numerical formula model according to a predetermined procedure enables to additionally perform combined checking of hardware and software of the electronic control unit.

5. The engine control experimenting apparatus according to claim 2, wherein the electronic control unit is configured to execute at least fuel injection control, engine speed control, and air-fuel ratio control, and execution of confirmation of results of said respective controls using a numerical formula model according to a predetermined procedure enables to additionally perform combined checking of hardware and software of the electronic control unit.

6. The engine control experimenting apparatus according to claim 1,
   wherein the container of the model engine is formed in a transparent container shape having a bottom thereof formed to be liquid-tight and the model engine includes a state of ignition by an ignition device and a state of fuel injection from an injector which are able to be visually observed and recognized through a side wall of the transparent container, and the liquid fuel injected from the injector and reserved at the bottom returns to the tank for circulation via a return pipe arranged at the bottom.

7. The engine control experimenting apparatus according to claim 6, wherein the electronic control unit is configured to execute at least fuel injection control, engine speed control, and air-fuel ratio control, and execution of confirmation of results of said respective controls using a numerical formula model according to a predetermined procedure enables to additionally perform combined checking of hardware and software of the electronic control unit.

8. The engine control experimenting apparatus according to claim 1, wherein the electronic control unit is configured to execute at least fuel injection control, engine speed control, and air-fuel ratio control, and execution of confirmation of results of said respective controls using a numerical formula model according to a predetermined procedure enables to additionally perform combined checking of hardware and software of the electronic control unit.

* * * * *